(12) United States Patent
Hikiji et al.

(10) Patent No.: US 9,851,220 B2
(45) Date of Patent: Dec. 26, 2017

(54) ROTATIONAL POSITION SENSOR STRUCTURE FOR AN INTAKE MANIFOLD

(71) Applicant: NISSAN MOTOR CO., LTD., Yokohama-shi, Kanagawa (JP)

(72) Inventors: Osamu Hikiji, Tokyo (JP); Stefan Born, Morsbach (DE)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 190 days.

(21) Appl. No.: 14/441,255

(22) PCT Filed: Nov. 7, 2013

(86) PCT No.: PCT/JP2013/080069
§ 371 (c)(1),
(2) Date: May 7, 2015

(87) PCT Pub. No.: WO2014/073587
PCT Pub. Date: May 15, 2014

(65) Prior Publication Data
US 2015/0292905 A1    Oct. 15, 2015

(30) Foreign Application Priority Data

Nov. 12, 2012  (JP) ................. 2012-248023

(51) Int. Cl.
*G01M 15/02* (2006.01)
*G01D 5/14* (2006.01)
(Continued)

(52) U.S. Cl.
CPC .......... *G01D 5/14* (2013.01); *F02B 31/06* (2013.01); *F02D 9/105* (2013.01); *F02D 9/1095* (2013.01); *F02M 35/104* (2013.01); *G01D 5/145* (2013.01); *G01D 11/245* (2013.01); *F02B 2023/106* (2013.01); *Y02T 10/146* (2013.01)

(58) Field of Classification Search
USPC ........................................ 73/114.36
See application file for complete search history.

(56) References Cited

U.S. PATENT DOCUMENTS 8,479,707 B2 * 7/2013 Mase ............... F02D 9/105
                                                123/399
2005/0194965 A1  9/2005 Su et al.

FOREIGN PATENT DOCUMENTS

DE       103 60 234 B3   4/2005
JP       2011-190727 A   9/2011

* cited by examiner

*Primary Examiner* — Eric S McCall
(74) *Attorney, Agent, or Firm* — Drinker Biddle & Reath LLP

(57) ABSTRACT

An assembly structure of a nonmagnetic member to which a position sensor arranged to to sense a rotation position of the rotation member, includes: a nonmagnetic member including a hollow portion; a cover which is fixed to an opening end portion of the hollow portion; and a retaining portion which is provided on an outer circumference portion of the hollow portion of the nonmagnetic member, and to which the position sensor is assembled from the opening end portion's side to be slid in a rotation axis direction, the cover restricting movements of the magnet holding portion and the position sensor in the rotation axis direction in a case where the cover is fixed to the nonmagnetic member in a state where the magnet holding portion and the position sensor are assembled to the nonmagnetic member.

5 Claims, 6 Drawing Sheets

(51) Int. Cl.
*F02M 35/104* (2006.01)
*F02D 9/10* (2006.01)
*F02B 31/06* (2006.01)
*G01D 11/24* (2006.01)
*F02B 23/10* (2006.01)

(A)

(B)

(A)

(B)

ROTATIONAL POSITION SENSOR STRUCTURE FOR AN INTAKE MANIFOLD

TECHNICAL FIELD

This invention relates to an assembly structure of a nonmagnetic member to which a position sensor can be assembled.

BACKGROUND ART

An intake manifold of an internal combustion engine which is a nonmagnetic member, and which is made of synthetic resin is provided with an intake air flow control valve such as a tumble control valve and a swirl control valve, and a position sensor arranged to sense a variation of magnetic flux of a magnet attached to a rotation member of this intake air flow control valve, and thereby to sense an opening degree of this intake air flow control valve (cf. a patent document 1). In this assembly structure of the position sensor, for example, a magnet holding portion arranged to hold the magnet is inserted into a hollow portion of the intake manifold through which the rotation member is inserted, from the opening end portion side of the hollow portion, so that the magnet holding portion is assembled to one end of the rotation member. The opening end portion of this hollow portion is closed by a cover which is a different member in a closing state. The position sensor is tightened and fixed to a portion of the intake manifold which confronts the magnet, by using a fixing tool such as screw and bolt.

PRIOR ART DOCUMENT

Patent Document

Patent Document 1: Japanese Patent Application Publication No. 2011-190727

SUMMARY OF THE INVENTION

Problems which the Invention is Intended to Solve

However, in the above-described assembly structure, the fixing tool for tightening the position sensor to the intake manifold, and the cover for closing the opening end portion of the hollow portion are independently needed. Accordingly, there are generated problems that the number of the components are increased, and that the size and the weight are increased.

Accordingly, it is conceivable that the sensor is integrally provided to the cover closing the hollow portion for decreasing the number of the components. However, in this case, in case of manufacturing a vehicle in which the position sensor is not provided for simplification, for example, the intake manifold in which the one end of the hollow portion is not opened (which has no opening end portion) is needed to be casted by using an insert die. At the cast, the die setup operation is needed, so that the productivity is remarkably deteriorated.

Means for Solving the Problem

The present invention was accomplished in light of the above-mentioned circumstances. That is, in the present invention, an assembly structure of a nonmagnetic member to which a position sensor arranged to sense a variation of magnetic flux of a magnet rotated with a rotation member around a rotation axis, and thereby to sense a rotation position of the rotation member, the assembly structure includes: a nonmagnetic member including a hollow portion in which the rotation member is rotatably inserted; a cover which is fixed to an opening end portion of the hollow portion of the nonmagnetic member to close the opening end portion of the hollow portion of the nonmagnetic member; a magnet holding portion which holds the magnet, and which is inserted in the hollow portion of the nonmagnetic member from the opening end portion's side, the magnet holding portion being arranged to be assembled to an end portion of the rotation member to rotate as a unit with the end portion of the rotation member; and a retaining portion which is provided on an outer circumference portion of the hollow portion of the nonmagnetic member, and to which the position sensor is assembled from the opening end portion's side to be slid in a rotation axis direction.

The cover restricts a movement of the magnet holding portion in the rotation axis direction, and a movement of the position sensor in the rotation axis direction in a case where the cover is fixed to the nonmagnetic member in a state where the magnet holding portion and the position sensor are assembled to the nonmagnetic member.

Benefit of the Invention

In this way, in the present invention, the cover closing the opening end portion of the hollow portion of the nonmagnetic member restricts the movements of the magnet holding portion and the position sensor in the axial direction. Accordingly, the cover also has a function to stably hold and fix the magnet holding portion and the position sensor to the nonmagnetic member's side. Consequently, it is possible to decrease the number of the components, to simplify the structure, and to decrease the size and the weight, relative to a case where the magnet holding portion and the position sensor are fixed to the nonmagnetic member by using the fixing tool which is a member different from the cover.

Moreover, the magnet holding portion and the position sensor are members different from the cover. Accordingly, in manufactures in which the position sensor is not used, the position sensor (and the magnet holding portion) is merely omitted, it is possible to close the opening end portion of the hollow portion by the cover identical to a case of using the position sensor. The cover and the nonmagnetic member need not to be varied. In this way, it is possible to commonly use the same members which are used as the nonmagnetic member and the cover without change, between the manufactures using the position sensor, and the products using no position sensor. It is possible to communalize the assembly process in the both manufactures, except for the process of mounting the position sensor (and the magnet holding portion). Accordingly, it is possible to improve the productivity.

DESCRIPTION OF EMBODIMENTS

Figure 1:
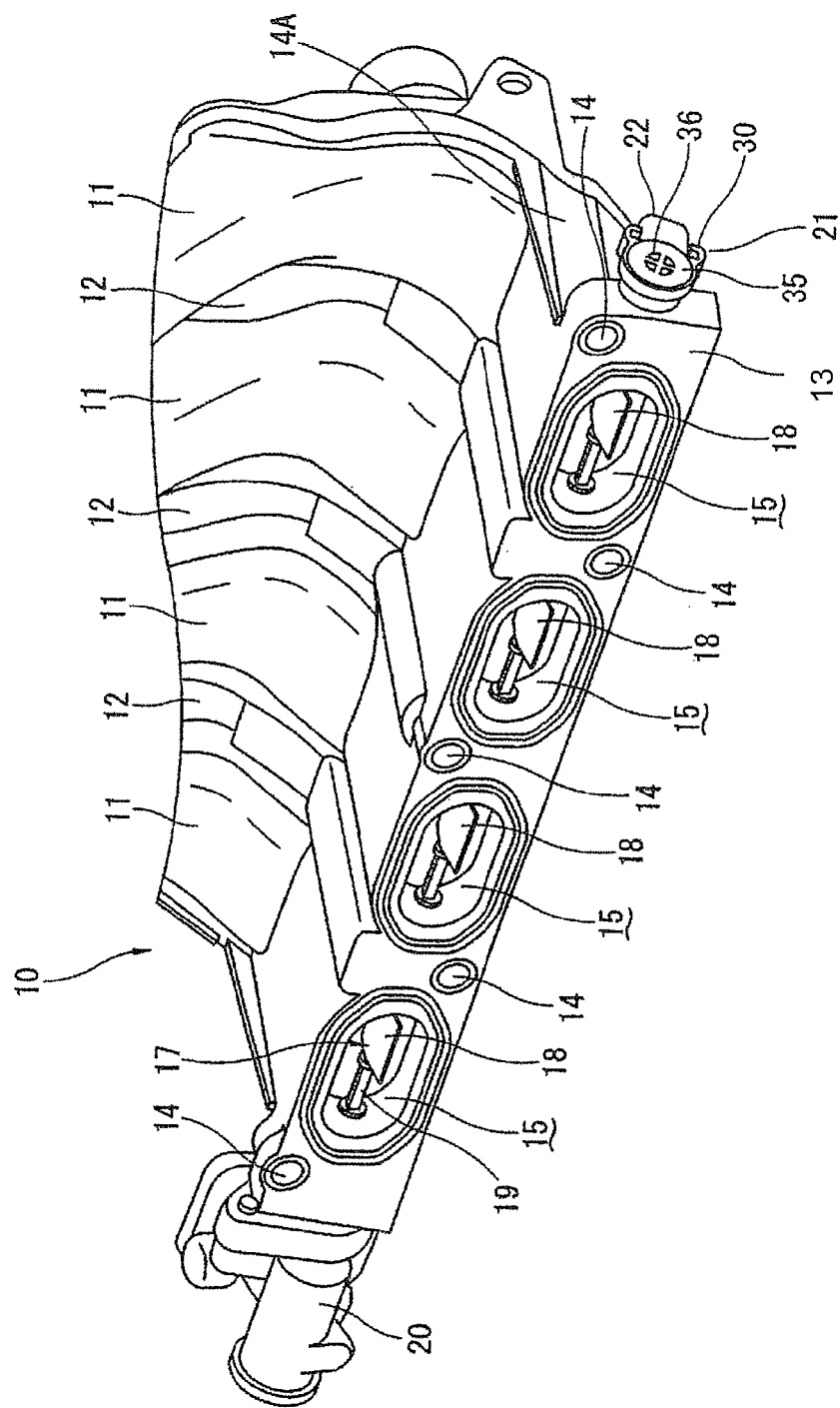
FIG. 1 is a perspective view showing a main part of an intake manifold of an internal combustion engine to which an assembly structure according to one embodiment of the present invention is applied.

Hereinafter, the present invention is concretely illustrated with reference to one shown in the drawings. FIG. 1 is a perspective view showing a main part of an intake manifold 10 which is for a four cylinder internal combustion engine, and which is a nonmagnetic member in the one embodiment of the present invention. This intake manifold 10 is constituted by assembling a plurality of synthetic resin components. There are provided four intake branches 11 which are provided in parallel to the intake manifold 10 through connection wall portions 12 in a cylinder row direction, and in which intake passages 15 connected to intake ports of cylinder head are formed. This intake manifold 10 includes a flange portion 13 which is formed to have a large thickness. The intake manifold 10 is fixed to the cylinder head (not shown) at the flange portion 13 by being screwed by a plurality of bolts. The flange portion 13 includes bolt holes 14 which penetrate through the flange portion 13, and through which the above-described bolts are inserted. Intake passages 15 of the intake branches 11 are formed and opened on a head mounting surface of the flange portion 13. Besides, a symbol 14A is an interference avoiding groove arranged to avoid an interference with a tool for tightening the bolts (cf. FIG. 1, FIG. 5, and FIG. 6).

This flange portion 13 is attached with a TCV (tumble control valve) 17 which is an intake air flow control valve arranged to regulate a flow of the intake air, and which is arranged to regulate a tumble flow component of the intake air. This TCV 17 includes four valve elements 18 which are disposed in the intake passages 15 within the intake branches 11, and each of which is arranged to open and close a part of the corresponding one of the intake passages 15; and a rotation member 19 which is inserted into the four valve elements 18, and which penetrates in the cylinder row direction through a portion near the flange portion 13 of the intake manifold 10. The rotation member 19 is rotatably supported on the flange portion 13 of the intake manifold 10. The rotation member 19 has a polygonal section (a rectangular section in this embodiment). The rotation member 19 is mounted in mounting holes of the valve elements 18 which are similarly formed to have a polygonal section. With this, the rotation member 19 rotates as a unit with the valve elements 18.

A motor 20 which is an actuator is mounted to one end portion of the rotation member 19. This motor 20 is arranged to vary a rotation angle position of the rotation member 19, and thereby to rotate the valve elements 18, so as to regulate the tumble flow component. A control section (not shown) controls operation of this motor 20 in accordance with a driving state of the engine.

An assembly (assembling, mounting) structure 21 is provided to a portion near the other end portion of the rotation member 19. A position sensor 22 arranged to sense the rotation position of the rotation member 19 according to the opening degree of the valve elements 18 can be assembled to the assembly structure 21. The signal sensed by this position sensor 22 is inputted to the above-described control section. This signal is used for the other control operation such as feedback control of the motor 20 and intake air amount control.

Next, the assembly structure 21 of the position sensor 22 which is the main part according to this embodiment is concretely illustrated with reference to FIG. 2 to FIG. 6.

Figure 4:
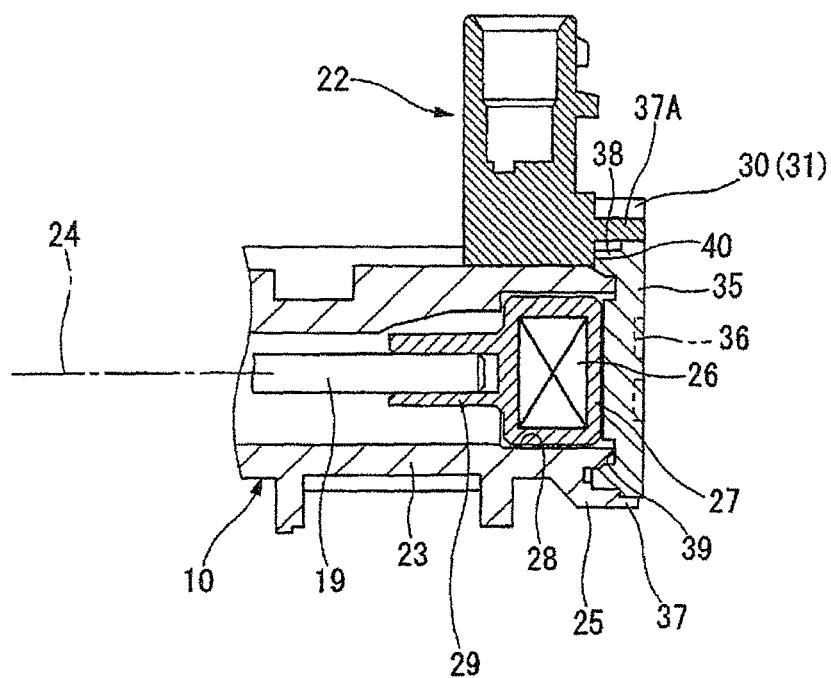
FIG. 4 is a sectional view showing the portion of the intake manifold to which the position sensor is assembled.

As shown in FIG. 4, the intake manifold 10 includes a hollow portion 23 which is a cylindrical (hollow) shape, into which the rotation member 19 is inserted, and which extends in the rotation axis direction along a rotation axis 24 of the rotation member 19. This hollow portion 23 is opened on the opening end portion 25 which is one end portion.

This hollow portion 23 includes a magnet receiving portion 28 which is formed near the opening end portion 25 of the hollow portion 23, and which includes a portion having a larger diameter. A magnet holding portion 27 is received and disposed within this magnet receiving portion 28 to be rotated around the rotation shaft 24. The magnet holding portion 27 holds a magnet 26 which is a permanent magnet. This magnet holding portion 27 is inserted from the opening end portion 25's side into the hollow portion 23. This magnet holding portion 27 is assembled to one end of the rotation member 19. That is, the magnet holding portion 27 receives and holds therein the magnet 26. Moreover, the magnet holding portion 27 includes a mounting groove 29 which has a rectangular section, and in which the one end of the rotation member 19 is mounted. The one end of the rotation member 19 is to mounted in this mounting groove 29, so that the rotation member 19 and the magnet holding portion 27 rotate as a unit with each other around the rotation axis. That is, the one end of the rotation member 19 is rotatably supported through the magnet holding portion 27 on the intake is manifold 10.

Figure 2:
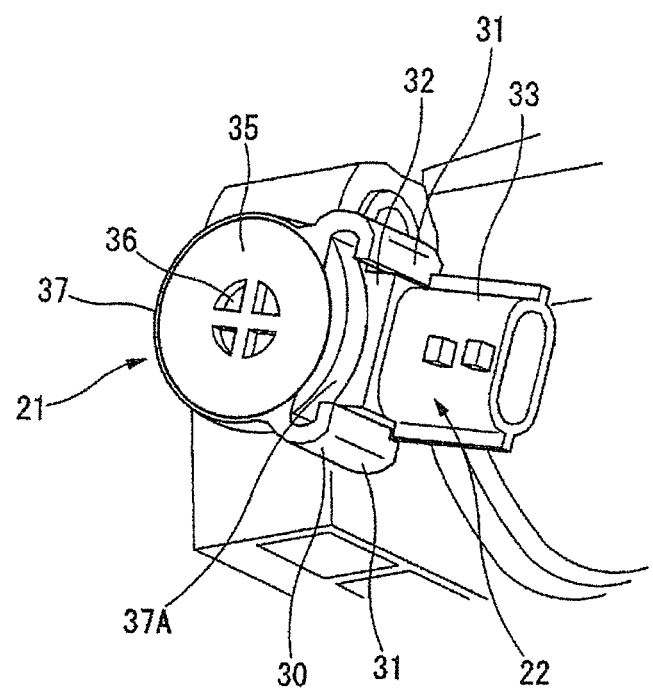
FIG. 2 is a perspective view showing a portion of the intake manifold to which a position sensor is assembled.
Figure 3:
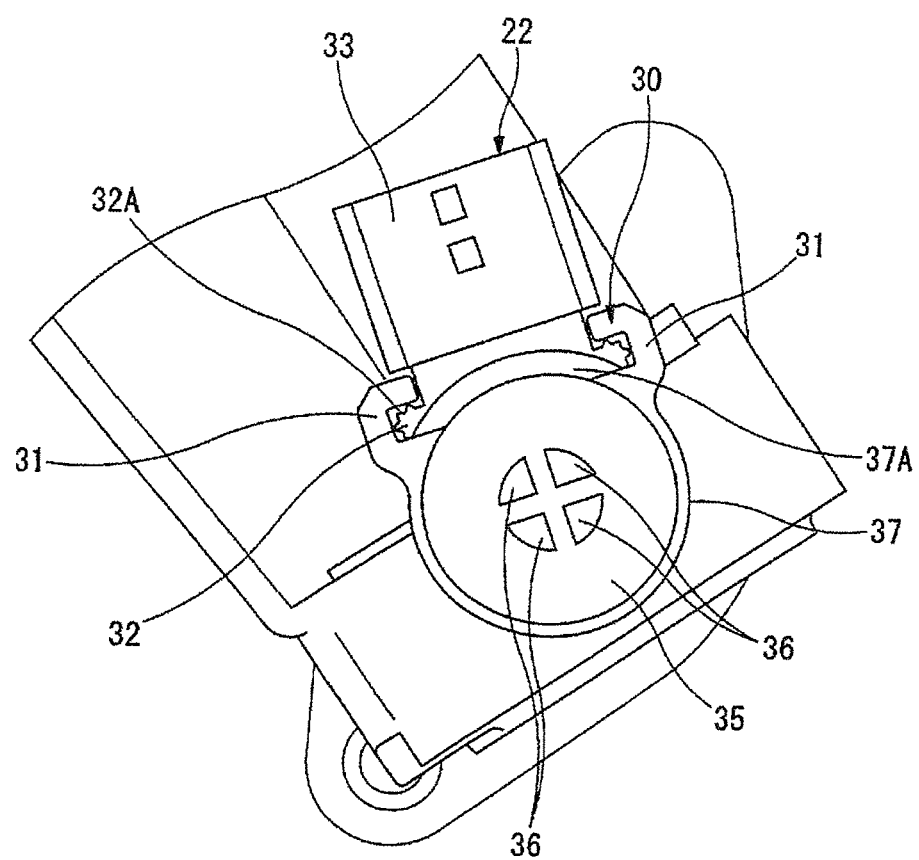
FIG. 3 is a front view showing the portion of the intake manifold to which the position sensor is assembled.

As shown in FIG. 2 and FIG. 3, the intake manifold 10 includes a retaining portion 30 which is formed on an outer circumference portion of the hollow portion 23. A base portion 32 of the position sensor 22 which has a large width is slidably mounted from the opening end portion 25's side in this retaining portion 30. That is, this retaining portion 30 includes a pair of guide piece portions 31 each of which has a U-shaped section to sandwich the base portion 32 of the position sensor 22 from the both sides. In a state where the base portion 32 of the position sensor 22 is inserted in this retaining portion 30 from the opening end portion 25's side, and pressed to the predetermined position along the rotation axis direction, the retaining portion 30 restricts a movement of the position sensor 22 except for the movement in the rotation axis direction.

Besides, as shown in FIG. 3, a recessed and raised portion 32A is provided on an outer surface of the base portion 32 of the position sensor 22. This recessed and raised portion 32A is appropriately slidably abutted on the inner surfaces of the guide piece portions 31. With this, it is possible to suppress the increase of the insertion resistance, to keep the appropriate contact with the guide piece portions 31, and to stably hold the position sensor 22 to the retaining portion 30.

A Hall element (not shown) is installed in the position sensor 22. The Hall element is disposed a predetermined distance in the radially outward direction of the magnet 26. The position sensor 26 is arranged to sense, by this Hall element, a variation of magnetic flux of the magnet 26 rotated with the rotation member 19, and thereby to sense the rotation position of the rotation member 19. This position sensor 22 is made of the synthetic resin material identical to that of the intake manifold. A connection connector 33 for connection with external devices is provided to this position sensor 22 to stand from the above-described base portion 32.

Moreover, a cover 35 is provided to close the opening end portion 25 of the hollow portion 23 of the intake manifold 10 in a closing state. This cover 35 has a disc shape made of the synthetic resin material identical to that of the intake manifold 10. This cover 35 is joined and fixed to circumference (peripheral) portion of the opening end portion 25 of the hollow portion 23 by spin welding. With this, the cover 35 closes the hollow portion 23 in the closing state. The cover 35 includes four tool holes 36 which are formed on the front surface of the cover 35, and in which a jig is mounted for rotating the cover 35 at the high speed at the spin welding.

Figure 5:
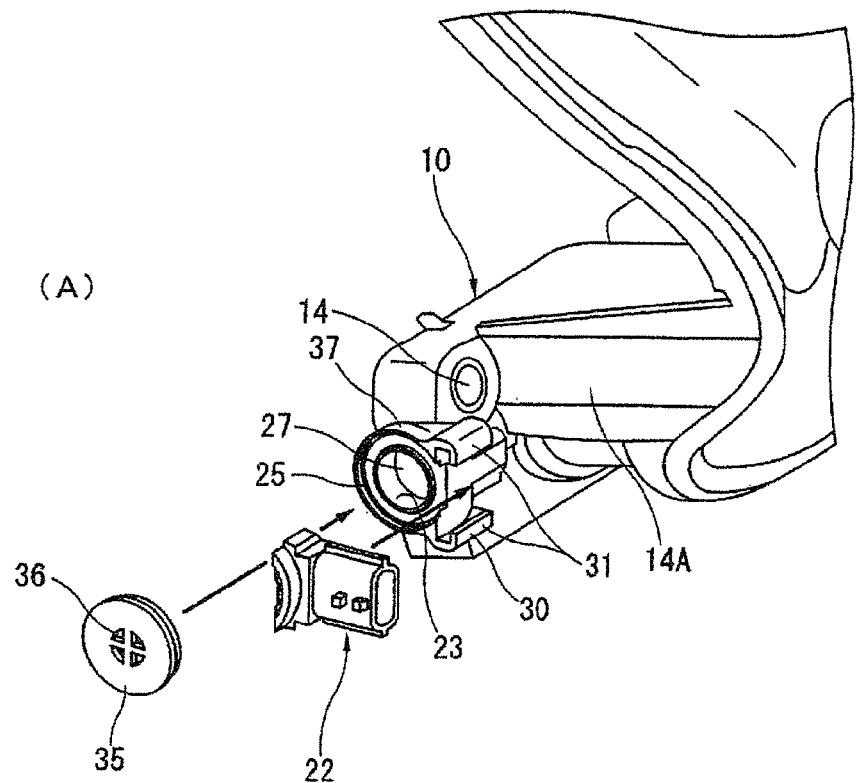
FIG. 5 are illustrative views showing an assembly step in a case where the position sensor is employed.
Figure 5:
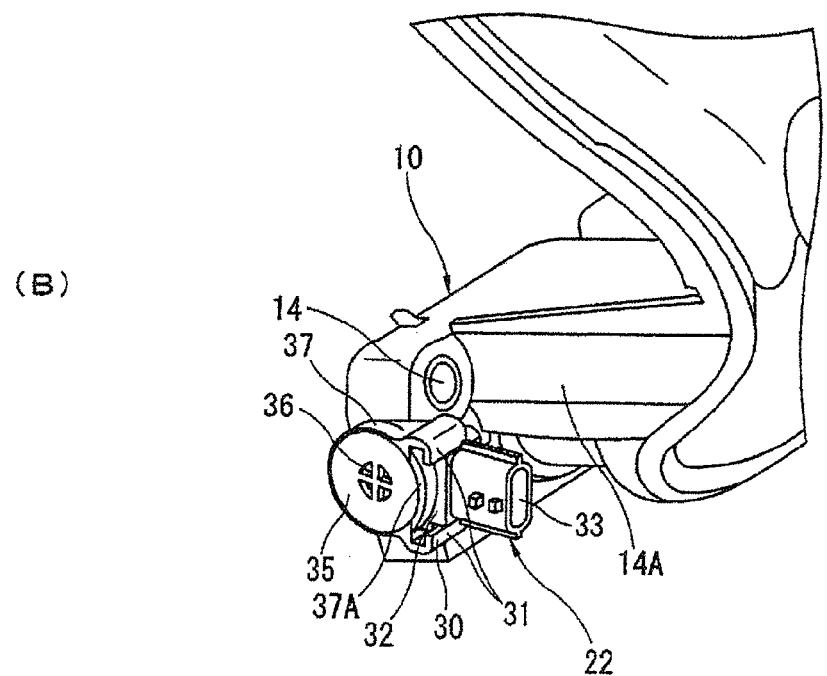

In a case of the vehicle to which the position sensor 22 is mounted, the cover 35 is joined and fixed to the opening end portion 25 of the hollow portion 23 by the spin welding, in a state where the magnet holding portion 27 and the position sensor 22 are assembled in the intake manifold 10 in the rotation axis direction, as shown in FIG. 5. This cover 35 restricts the movement of the magnet holding portion 27 in the rotation axis direction, and restricts the movement of the position sensor 22 in the rotation axis direction, so that the magnet holding portion 27 and the position sensor 22 are stably held in predetermined positions.

That is, the cover 35 has a diameter larger than that of the opening end portion 25 of the hollow portion 23, as shown in FIG. 4. When viewed in the rotation axis direction, the outer circumference portion of the cover 35 covers a part of the position sensor 22. In this relationship, as shown in FIG. 2 and FIG. 4, the opening end portion 25 of the hollow portion 23 includes a guide wall portion 37 which is a cylindrical shape, which has a small depth, and which surrounds the outer circumference of the cover 35 to restrict the movement of the cover 35 in the radial direction at the spin welding. However, a part of the guide wall portion 37 is cut at the retaining portion 30 in which the position sensor 22 is mounted. The base portion 32 of the position sensor 22 includes an auxiliary guide wall portion 37A which has a sectorial section, and which protrudes in the rotation axis direction to be embedded this cutout portion of the part of the guide wall portion 37. As shown in FIG. 2, in a state where the position sensor 22 is mounted in the retaining portion 30, the guide wall portion 37 formed in the hollow portion 23, and the auxiliary guide wall portion 37A formed in the position sensor 22 are continuous in the circumferential direction. The guide wall portion 37 and the auxiliary guide wall portion 37A cover the entire outer circumference of the cover 35.

As shown in FIG. 4, on the back surface of the cover 35 and the tip end surface of the opening end portion 25 of the hollow portion 23 which are welded with each other, there are provided a circumferential protrusion 38, a circumferential groove 39 and so on which are mounted with each other, so as to surely weld, at the predetermined positions, the back surface of the cover 35 and the tip end surface of the opening end portion 25 of the hollow portion 23. A part of the circumferential protrusion 38 of the cover 35 is arranged to be abutted on a flat abutting surface 40 which has a stepped shape, and which is formed inside the auxiliary guide wall portion 37A of the position sensor 22.

At the spin welding, the tip end portion of the opening end portion 25 of the hollow portion 23 which is abutted on the back surface of the cover 35 rotated at the high speed is fused (melted), the cover 35 is moved forward in the leftward direction of FIG. 4 along the rotation axis direction. Finally, the tip end of the circumferential protrusion 38 of this cover 35 is abutted on the abutting surface 40 of the position sensor 22. Consequently, the cover 35 is welded to the opening end portion 25 of the hollow portion 23. Moreover, the cover 35 holds a state where the position sensor 22 is pressed in the rotation axis direction. Furthermore, the outer circumference edge portion of the cover 35 and a part of the position sensor 22 are welded. On the other hand, the magnet holding portion 27 confronts the back surface of the cover 35 with a slight gap. The magnet holding portion 27 is rotatably held within the magnet receiving portion 28 of the hollow portion 23 in a state where the movement of the magnet holding portion 27 in the rotational axis direction is restricted.

Figure 6:
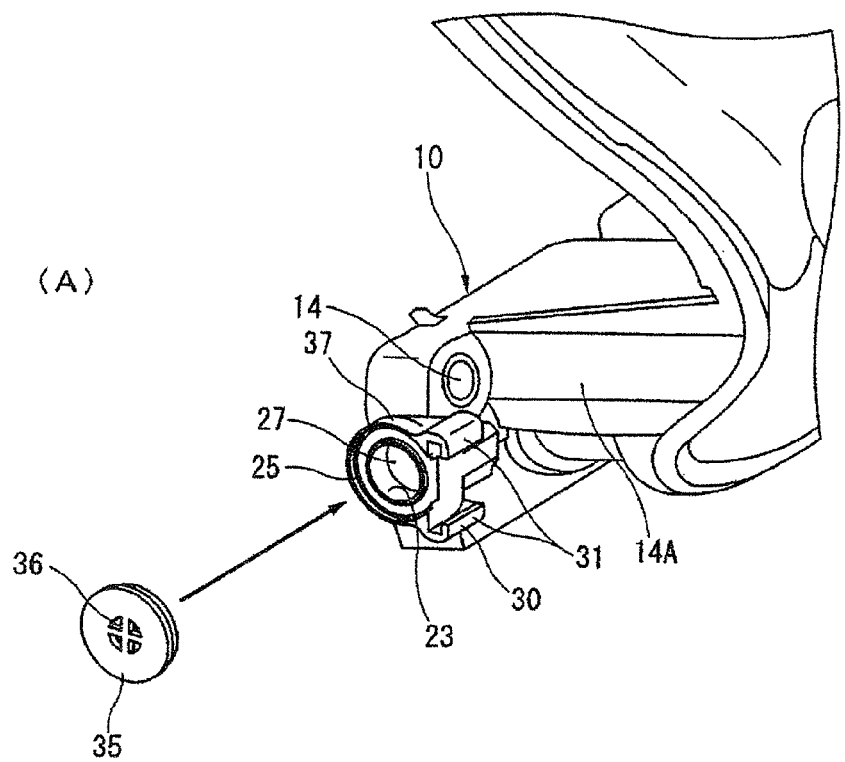
FIG. 6 are illustrative views showing an assembly step in a case where the position sensor is not employed.
Figure 6:
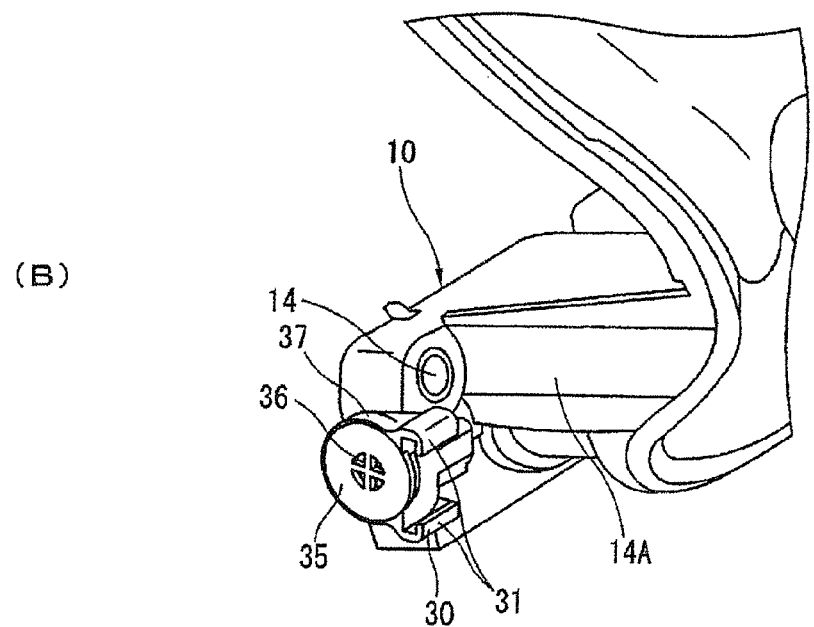

FIG. 6 are an assembly structure of a vehicle in which the position sensor 22 is not mounted. In this case, the cover 35 is joined merely by the spin welding to the opening end portion 25 of the hollow portion 23 of the intake manifold 10 to which the position sensor 22 is not assembled, so that the opening end portion 25 of the hollow portion 23 is in the closing state. Besides, in this example, the magnet holding portion 27 is assembled for rotatably supporting the end portion of the rotation member 19. However, this magnet holding portion 27 may be omitted similarly to the position sensor 22.

In this embodiment, the cover 35 is joined to the opening end portion 25 of the hollow portion 23 of the intake manifold 10 which is the nonmagnetic member. With this, the cover 35 closes the opening end portion 25 in the closing state. Moreover, the cover 35 restricts the movements of the magnet holding portion 27 and the position sensor 22 along the direction of the rotation axis 24. This cover 35 also serves to stably hold and fix the magnet holding portion 27 and the position sensor 22 to the intake manifold 10's side. Accordingly, it is possible to decrease the number of the components, to simplify the structure, and to attain the size reduction and the weight reduction, relative to a structure in which the magnet holding portion 27 and the position sensor 22 are fixed to the intake manifold 10 by using a fixing tool which is a member different from the cover 35.

Moreover, the cover 35 is a member different from the magnet holding portion 27 and the position sensor 22. In case of the vehicle in which the position sensor 22 is not used, it is possible to merely omit the position sensor 22 (and the magnet holding portion 27), and to close the opening end portion 25 of the hollow portion 23 by the cover 35 exactly similarly to the case of the vehicle in which the position sensor 22 is used. It is unnecessary that the cover 35 and the intake manifold 10 are varied. In this way, the same structure is commonly used in the vehicle in which the position sensor 22 is used, and in the vehicle in which the position sensor 22 is not used, without varying the intake manifold 10 and the cover 35. Accordingly, it is possible to remarkably improve the productivity.

Hereinabove, the present invention is illustrated with reference to the concrete embodiment. However, the present invention is not limited to the above-described embodiment. The present invention may include various variations and modifications. For example, in the embodiment, the present invention is applied to the intake manifold of the internal combustion engine. However, the present invention is not limited to this. The present invention is applicable to various nonmagnetic members to which a position sensor arranged to sense a rotation position of the rotation member can be assembled.

The invention claimed is:

1. An assembly structure of a nonmagnetic member to which a position sensor arranged to sense a variation of magnetic flux of a magnet rotated with a rotation member around a rotation axis, and thereby to sense a rotation position of the rotation member, the assembly structure comprising:

a nonmagnetic member including a hollow portion in which the rotation member is rotatably inserted;

a cover which is fixed to an opening end portion of the hollow portion of the nonmagnetic member to close the opening end portion of the hollow portion of the nonmagnetic member;

a magnet holding portion which holds the magnet, and which is disposed within the hollow portion of the nonmagnetic member, the magnet holding portion being fixed at an end portion of the rotation member, and arranged to rotate as a unit with an end portion of the rotation member; and a retaining portion which is provided on an outer circumference portion of the hollow portion of the nonmagnetic member, and within which the position sensor is retained, and which restricts a movement of the position sensor that is other than a movement of the position sensor in a direction of the rotation axis, the cover being fixed to the nonmagnetic member, the cover directly confronting the magnet holding portion, and restricting a movement of the magnet holding portion in the direction of the rotation axis, and the movement of the position sensor in the direction of the rotation axis.

2. The assembly structure of the nonmagnetic member as claimed in claim 1, wherein the cover is welded to the opening end portion of the hollow portion of the nonmagnetic member.

3. The assembly structure of the nonmagnetic member as claimed in claim 1, wherein the cover is welded to the opening end portion of the hollow portion of the nonmagnetic member and the position sensor.

4. The assembly structure of the nonmagnetic member as claimed in claim 1, wherein the nonmagnetic member is an intake manifold of the internal combustion engine.

5. The assembly structure of the nonmagnetic member as claimed in claim 4, wherein the position sensor is arranged to sense a rotation position of an intake air flow control valve arranged to regulate a flow of an intake air.

* * * * *